OR 3,655,271

United States
Suzuki

[15] 3,655,271
[45] Apr. 11, 1972

[54] ZOOM LENS FOR NORMAL AND CLOSE-UP PHOTOGRAPHY

[72] Inventor: Yasuo Suzuki, Kashiwa, Japan
[73] Assignee: Sun Koki Kabushiki Kaisha, Ichikawa-shi, Chiba-ken, Japan
[22] Filed: May 11, 1970
[21] Appl. No.: 36,243

[30] Foreign Application Priority Data

May 19, 1969 Japan...................44/45269

[52] U.S. Cl.................................350/187, 95/45
[51] Int. Cl.................................G02b 7/10
[58] Field of Search..................................350/187

[56] References Cited

UNITED STATES PATENTS

3,277,783  10/1966  Eggert.....................350/187
3,118,359  1/1964   Leitz et al................350/187
3,465,662  9/1969   Kashiwase................350/187 X Primary Examiner—John K. Corbin
Attorney—Steinberg and Blake

[57] ABSTRACT

A zoom lens which can carry out conventional zoom lens functions so as to vary the focal length of an objective in a continuous manner while maintaining the object in sharp focus at the image plane. The zoom lens has a lens assembly capable of being displaced along the optical axis by a manually operable means. A transmission transmits movement of the manually operable means to a second lens assembly which is also displaced in this way along the optical axis. However, it is possible to disconnect the transmission from the manually operable means, so that while the second lens assembly remains stationary it is possible to move only the first lens assembly by way of the manually operable means. In this way it is possible to utilize the zoom lens, not only for normal zoom lens functions, but also for the purpose of close-up photography.

15 Claims, 12 Drawing Figures

Patented April 11, 1972

INVENTOR
YASUO SUZUKI
BY
Steinberg & Blake
ATTORNEYS

INVENTOR
YASUO SUZUKI
BY
Steinberg & Blake
ATTORNEYS

ZOOM LENS FOR NORMAL AND CLOSE-UP PHOTOGRAPHY

BACKGROUND OF THE INVENTION

The present invention relates to photographic structures.

In particular, the present invention relates to zoom lenses.

As is well-known, zoom lens structures are capable of being manipulated so as to provide a continuously variable focal length while maintaining an object imaged sharply at the focal plane.

Structures of this type generally include a plurality of lens assemblies which move along the optical axis to bring about the variable focal length. Rotary movement given by the operator to manually operable structure at the exterior of the lens barrel, is transmitted to the interior of the lens barrel so as to bring about the relative movement between the interior lens assemblies which results in the normal functions of a conventional zoom lens.

However, such conventional zoom lens structures suffer from the drawback of being of limited utility in that the lens assemblies which are movable along the common optical axis are necessarily constrained to have given positions relative to each other depending upon the manual setting of the zoom lens structure. Thus, while such structures are perfectly satisfactory for providing a variable focal length for a zoom lens objective within a given range, it is not possible to utilize a conventional zoom lens for close-up photography where it is necessary to provide a sharp image of an object which is relatively close to the objective, because close-up photography requires lens assemblies which must have with respect to each other a position completely different from that which can be achieved with conventional zoom lenses.

SUMMARY OF THE INVENTION

It is accordingly a primary object of the invention to provide a construction which will enable a zoom lens to carry out not only normal, conventional zoom lens operations but which in addition will enable a zoom lens to carry out close-up photography.

In particular, it is an object of the invention to provide a simple, easily manipulated structure which gives the operator the possibility of moving at least one lens assembly of a zoom lens with respect to another in a manner completely different from which has heretofore been possible and in a manner which will enable close-up photography operations to be carried out, while at the same time retaining for the zoom lens all of its normal functions.

In addition, it is an object of the invention to provide a construction which will prevent the zoom lens from departing from its normal zoom lens functions unless a given lens assembly is properly positioned for close-up photography.

Also, it is an object of the invention to provide a construction which will reliably maintain a given lens assembly in a position which is proper for close-up photography as long as the zoom lens has not reached a position where the interior lens assemblies thereof are located properly for normal zoom lens operations.

Also, it is an object of the invention to provide a construction capable of achieving the above objects with relatively simple, inexpensive, and compact components which do not materially increase the cost of a conventional zoom lens.

According to the invention, the zoom lens has a pair of lens assemblies which have a common axis and a support means which supports the pair of lens assemblies for movement along this common axis. A manually operable means is operatively connected with one of the lens assemblies for displacing it along its axis, and a transmission means has a normal engaged position engaged with the manually operable means for transmitting movement thereof to the other of the lens assemblies for simultaneously displacing the latter along the axis thereof as the first lens assembly is axially displaced. This transmission means, however, has also a disengaged position where there is an interruption in the transmission of movement from the manually operable means to the second lens assembly, and thus when the transmission means is disengaged, this latter lens assembly will remain stationary while the manually operable means moves only the first of the lens assemblies. These latter conditions are suitable for close-up photography. A selecting means coacts with the transmission means for selectively placing it in its engaged or disengaged positions, so that through this selecting means it is possible to select either normal zoom lens operations or zoom lens operation for close-up photography.

BRIEF DESCRIPTION OF DRAWINGS

The invention is illustrated by way of example in the accompanying drawings which form part of this application and in which:

FIG. 8 is a longitudinal elevation which shows in axial section above a central horizontal plane a further embodiment of a zoom lens according to the invention;

DESCRIPTION OF PREFERRED EMBODIMENTS

Figure 1:
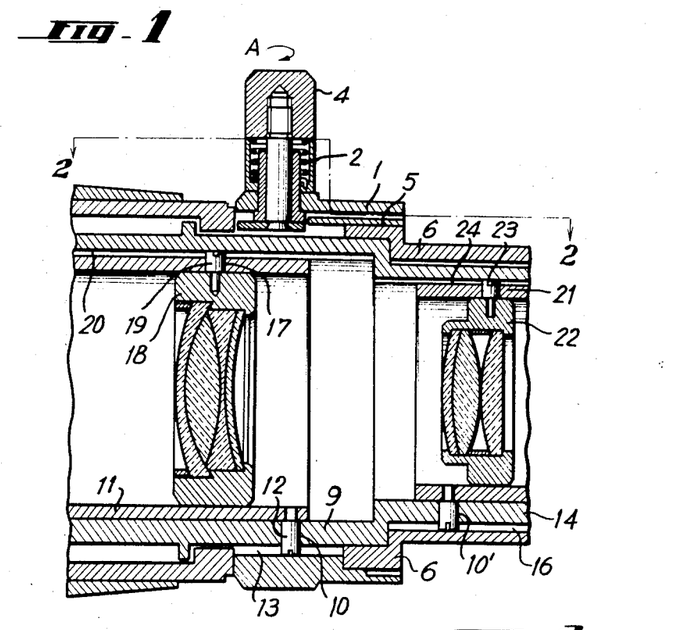
FIG. 1 is a fragmentary sectional elevation taken in a plane containing the optical axis of the illustrated zoom lens structure and showing a pair of axially displaceable lens assemblies and the structure of the invention which coacts therewith.
Figure 2:
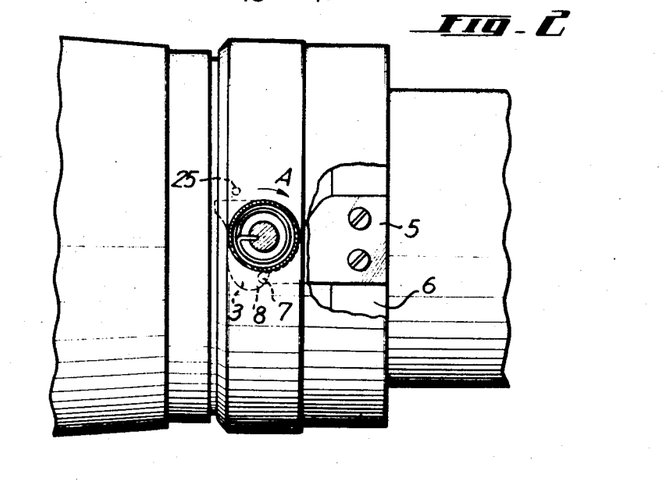
FIG. 2 is a top plan view of the structure of FIG. 1 taken along line 2—2 of FIG. 1 in the direction of the arrows, with FIG. 2 being partly broken away so as to more clearly illustrate the structure of the invention.
Figure 3:
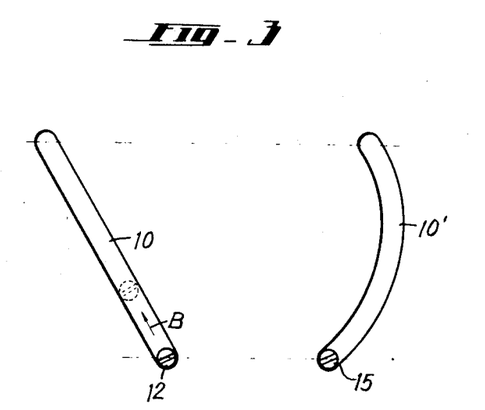
FIG. 3 is a diagrammatic representation of camming slots of a main camming cylinder.

Referring first to FIGS. 1–3, the illustrated structure includes a manually operable means formed in part by an outer rotary ring 1 which can be turned about the optical axis by the operator. The ring 1 has a projecting knob 4 projecting radially from the ring 1. As is apparent from the upper portion of FIG. 1, the knob 4 is turnable about a radial axis extending radially with respect to the optical axis, and this knob 4 forms part of a selecting means for a purpose described below. This selecting means is operatively connected with a connecting means formed in part by a connecting portion 3. This connecting portion 3 is in the form of a member turnable with the knob 4 and situated in a space defined between the ring 1 and the exterior surface of the main cam cylinder 9 which forms the support means for the illustrated structure. A spring 2 acts to urge the connecting plate 3 to rotate in a counterclockwise direction, opposite to the direction indicated by the arrow A in FIG. 2. The releasable connecting means includes, in addition to the connecting portion 3, a connecting portion 5 in the form of a plate fixed to a second rotary ring 6 which forms a second manually operable means and which together with the elements 3 and 5 forms part of a transmission means for transmitting movement from the manually operable means formed in part by the ring 1. The connecting portion formed by the plate 5 has a projection 7 received in a recess 8 of the connecting portion 3. Thus, as long as the projection 7 is in the recess 8, the releasable connecting means formed by the portions 3 and 5 places the transmission means which includes the ring 6 in an engaged position engaged with the manually operable means formed in part by the ring 1, so that when the operator turns the latter the ring 6 will also turn.

The support means is formed by a main cam cylinder 9, as referred to above, and this main cam cylinder 9 has camming slots 10 and 10' the configuration of which is schematically represented in FIG.3. The manually operable means which includes the sleeve 1 also includes a pin 12 received in an inner axial groove 13 of the ring 1 and extending through the camming slot 10. Within the cylinder 9 the pin 12 is fixed with an auxiliary camming cylinder 11 which forms part of the manually operable means and which is formed with a camming slot 17 receiving a pin 19 which is fixed to and projects radially from a first lens assembly 18 supported by the support means 9 for movement along the optical axis. The main cylinder 9 is formed with an interior axial groove 20 receiving the outer end portion of the pin 19. It is apparent, therefore, that when the manually operable means formed by the train of elements 1, 12, 11, and 19 is operated by manual turning of the ring 1, the lens assembly 18 will be displaced along the optical axis.

The rotary ring 6 is formed with an inner axial groove 16 receiving the outer end of a pin 15 which extends through the camming slot 10'. At its inner end the pin 15 is connected to an auxiliary camming sleeve 14 formed with a camming slot 21 through which a pin 23 extends. The outer end of the pin 23 is received in a axial groove 24 formed at the interior of the main cylinder 9, and at its inner end the pin 23 is fixed with a second, outer lens assembly 22. Thus, the second manually operable means, which forms part of the transmission means from the first manually operable means, includes the ring 6, the pin 15, the auxiliary cylinder 14, and the pin 23. When the connecting means formed by components 3 and 5 is in its connecting position shown in FIG.2, the transmission means from the first manually operable means to the second lens assembly 22 is engaged so that both of the lens assemblies 18 and 22 are constrained to be displaced simultaneously along the common optical axis as determined by the configuration of the camming slots 10 and 10' indicated in FIG.3. In this way these lens assemblies 18 and 22 can carry out normal zoom lens functions.

As may be seen from FIG.2, the ring 1 has in its interior a pin 25 situated in the path of turning movement of the connecting member 3 so as to limit the extent to which the latter can turn in the direction of the arrow A.

In order to adapt this embodiment of the invention for close-up photography, the manually operable means which includes the ring 1 is operated until the pins 12 and 15 are brought to the ends of the camming slots 10 and 10', as indicated in solid lines in FIG.3. The result of this operation is that the pair of lens assemblies 18 and 22 are initially situated at predetermined locations along the optical axis. At this time, the knob 4, which forms a selecting means for this embodiment, is turned in the direction of the arrow A so that the connecting element 3 is displaced away from the connecting element 5 and the projection 7 of the latter is no longer received in the recess 8 of the former. The result is that the transmission means has now been placed by the selecting means in its disengaged position interrupting transmission of movement from the manually operable means connected to the lens assembly 18 to the lens assembly 22. At this time, the ring 1 is rotated while the ring 6 remains stationary so that while the pin 15 remains at the position shown in FIG.3, the pin 12 will be displaced along the camming slot 10, in the manner indicated by the arrow B and phantom lines in FIG.3. In this way it is possible to axially displace the lens assembly 18 while the lens assembly 22 remains at its predetermined location. With this arrangement, it is possible to carry out close-up photography.

In order to resume normal zoom lens photography, the ring 1 is simply returned to its initial angular position so that the connecting element 3 will resume its connected relationship with respect to the connecting element 5, the projection of the latter being automatically received within the recess 8 as the element 3 snaps over the tip 7 of element 5 upon return of the ring 1 to its initial position. The result is that the selecting means has now returned the transmission means to its engaged position, and now rotary movement of the ring 1 will be transmitted to the ring 6 and through the latter and the remainder of the transmission means to the lens assembly 22. Thus, normal zooming operations will now be resumed.

Figure 4:
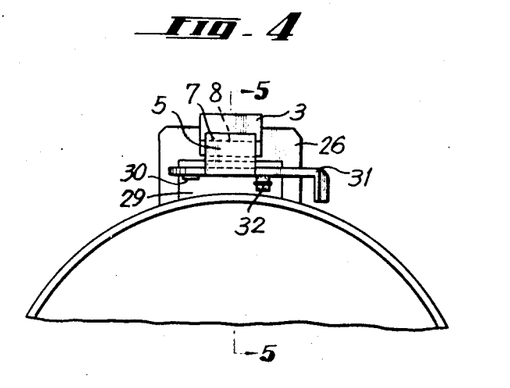
FIG. 4 is a fragmentary front elevation of another embodiment of a releasable transmission means of the invention.
Figure 5:
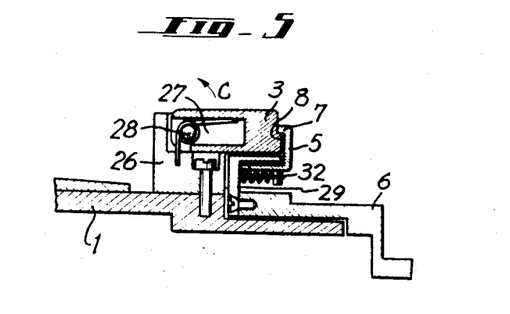
FIG. 5 is a fragmentary axial section of the structure of FIG. 4 taken along line 5—5 of FIG. 4 in the direction of the arrows.

In the embodiment of the invention which is illustrated in FIGS.4 and 5, the releasable connecting means includes a member 26 fixed to and projecting radially from the ring 1. The connecting element 3 in this case is pivotally supported on the member 26 by way of a pivot pin 28 carried by the latter. A spring 27 normally maintains the element 3 in an upright, disconnected position, the spring 27 urging the element 3 in the direction of the arrow C of FIG.5.

A member 29 is fixed to the second rotary ring 6, and this member 29 carries a pivot 30 which supports the second connecting element 5 for swinging movement about an axis normal to the plane of FIG.5, extending horizontally in FIG.4. Thus, the pin 30 supports element 5 for pivotal movement, and element 5 terminates in the projecting portion 7 received in the recess 8 of the member 3. This recess 8 is formed in this case by a shoulder, as is apparent from FIGS.4 and 5. A manually engagable lever 31 is fixed to and projects from element 5 so that the operator can at any time turn the element 5 in a clockwise direction, as viewed in FIG.5. Thus, element 31 forms a selecting means. A spring assembly 32 coacts with element 29 and element 5 to urge the latter in a counterclockwise direction, as viewed in FIG.5, to a location where the projection 7 is situated in the recess 8. When the operator presses downwardly on the selecting element 31, projection 7 is displaced away from recess 8 so that spring 27 can now turn connecting element 3 to its upright, disconnected position. In this way the selecting means places the transmission means which includes the ring 6 in its disengaged position. Ring 1 can now be turned independently of ring 6. Thus, in order to carry out close-up photography, while the transmission means is in the engaged position shown in FIGS.4 and 5, the rings 1 and 6 are turned so as to locate the pins 12 and 15 at the position shown in FIG.3. Except for the differences shown in FIGS.4 and 5, the structure of this embodiment is identical with that of FIGS.1-3. When the pins 12 and 15 have been located at the solid line position shown in FIG.3 the operator will engage the selecting means 31 so as to release the connecting means 3,5 for movement to its disconnecting position interrupting the transmission from the ring 1 to the ring 6. Now the ring 1 can be turned to carry out close-up photography operations. In order to resume normal zoom lens operations, the ring 1 is returned to its initial position and the operator swings the element 3 in a clockwise direction, as viewed in FIG.5 in opposition to the spring 27, causing the projection 7 to snap into the recess 8, and now the transmission means is again engaged so that manipulation of the manually operable means which includes the sleeve 1 will have the motion thereof transmitted to the front or outer lens assembly 22.

Figure 6:
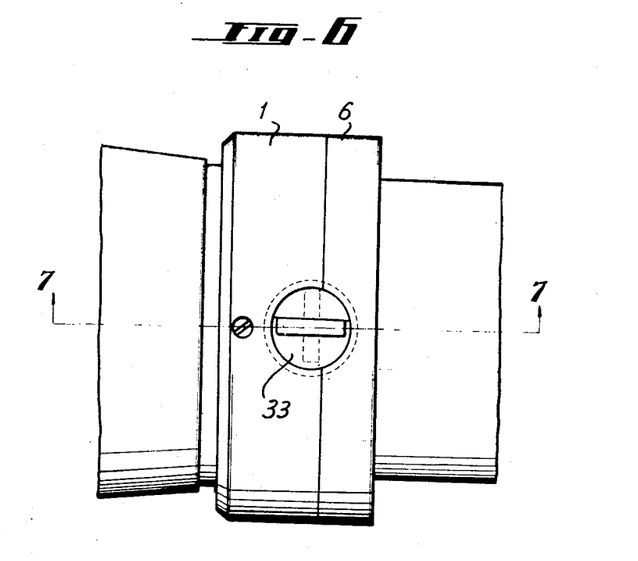
FIG. 6 is a fragmentary top plan view of a further embodiment of the releasable motion transmitting structure of the invention.
Figure 7:
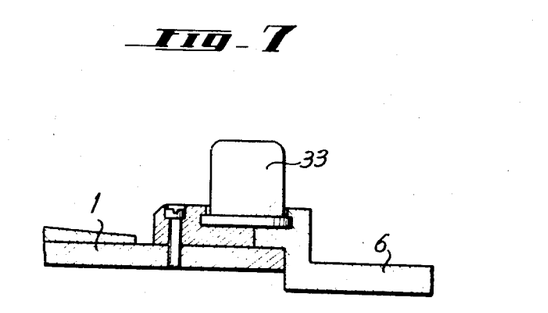
FIG. 7 is a fragmentary sectional elevation taken along line 7—7 of FIG. 6 in the direction of the arrows.

It will be noted that in the above embodiments the connecting portions 3 and 5 are located at those portions of the rings 1 and 6 where the peripheries of the latter adjoin each other. The same is true of the embodiment of FIGS.6 and 7 where the transmission between the rings 1 and 6 can be engaged or disengaged by way of a selecting means which includes an element 33 which can be engaged and turned by the operator between the solid and dotted line positions shown in FIG.6. This element 33 has a radially extending plate portion extending outwardly and accessible to the operator. This plate portion is fixed at its inner end to a circular plate portion which forms part of a circle, actually just over a semi-circle, as is apparent from FIG.6. This circular portion is received in circular grooves formed in the peripheral edge of arcuate recesses of the peripheral portions of the rings 1 and 6, so that when the latter have, with respect to each other, the angular position shown in FIG.6, a complete circular groove is formed to receive the circular part of the selecting means and connecting means 33. When the outwardly extending radial portion of the latter is in the solid line position of FIG.6, the circular portion extends into the arcuate grooves of both rings 1 and 6, and they are thus connected for rotation as a unit. On the other hand, by turning the outwardly projecting portion to the dotted line position shown in FIG.6, the connecting element 33 is no longer in overlapping relation with respect to the ring 6, and now the ring 1 together with the element 33 can be turned with respect to the ring 6 which remains stationary. Otherwise, the details of this embodiment are the same as those of FIGS.1-4, so that it is apparent that with the simple structure of FIG.6 and 7 it is also possible to carry out both close-up photography and normal zoom lens operations.

Figure 9:
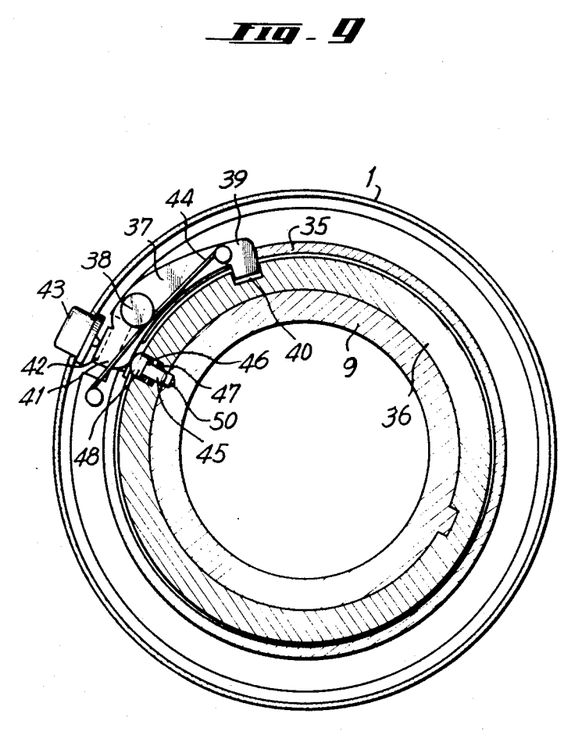
FIG. 9 is a transverse section of the structure of FIG. 8 taken at that part thereof where a releasable connecting means of the invention is located.

In the embodiment of the invention which is illustrated in FIGS.8 and 9, the first manually operable means includes a ring 35 surrounded by the ring 1 and connected to the latter for turning movement therewith. The rotary movement of the ring 35 is transmitted to the inner lens assembly 18 so as to shift the latter along the optical axis, in the manner described above in connection with FIG.1. The transmission means or second manually operable means includes a ring 36 surrounded by the ring 6 which is shown in FIG.8 and operating in the same way as the latter, in connection with the embodiment of FIG.1, for bringing about axial movement of the front or outer lens assembly 22. When the transmission means described below is engaged, these rings 35 and 36 will rotate as a unit about the main cam cylinder 9 which forms the support means for the lens assemblies 18 and 22.

The releasable connecting means of this embodiment includes one connecting portion formed by a swingable lever 37 and a second connecting portion formed by part of the ring 36 which is formed with the recess 40. This recess 40 receives the free end 39 of the lever 36 which is carried by a pivot 38 which is mounted on the ring 35 and has an axis parallel to the optical axis. A spring 44 coacts with the lever 37 for normally maintaining the end 39 of lever 37 in the recess 40, so that normally the transmission means is engaged and movement of the manually operable means 1, 35 will be transmitted to the front lens assembly 22.

At its end 41 which is distant from the projection 39, the lever 37 has a rearwardly extending axial lug 42 which projects behind a button 43. The spring 44 thus acts also to maintain the lug 42 in a position urging the button 43 outwardly to the location illustrated most clearly in FIGS.8 and 9.

With this embodiment, the ring 36 of the transmission means or second manually operable means is formed with a radial bore 46 which receives a pin 45 which forms a control means for this embodiment. This pin 45 has an outer head portion 48 which is urged outwardly by a spring 47. In this way the pin 48 is urged against the inner portion 49 of lever 37. The main cam cylinder or support means 9 is formed with a bore 50 which can receive the control pin 45 when the ring 36 is in the angular position shown in FIG.9 with respect to the cylinder 9.

In order to carry out close-up photography with the embodiment of FIGS.8 and 9, the manually operable means of this embodiment is actuated to locate the lens assemblies 18 and 22 at positions corresponding to the locations of the pins 12 and 15 in FIG.3, as described above in connection with FIG.1, so that the pair of lens assemblies are in the extreme telephoto positions. It is at this time that the ring 36 will have the angular position indicated in FIG.9. The operator will now depress the button 43 inwardly toward the optical axis, so that the lever 37 is swung in opposition to the spring 44 in a counterclockwise direction about the pin 38, as viewed in FIG.9. Thus, the end 39 of lever 37 is displaced out of the recess 40. In this way the selecting means formed by element 43 and the connecting means formed by lever 37 and the portion of ring 36 formed with recess 40 are actuated to place the transmission means to the lens assembly 22 in its disengaged position. Simultaneously with this operation, the end of the lever 37 distant from its projection 39 presses with its surface 49 against the pin 45 to displace the latter into the recess 50. This operation provides a connection between the main cylinder 9 and the ring 36. Thus, the pin 45 forms a control means which prevents movement of the lens assembly 22 as long as the ring 36 is locked in the position shown in FIG.9 by the extension of the pin 45 into the recess 50.

Now the manually operable means, which includes the rings 1 and 35, can be manipulated to displace the lens assembly 18 while the lens assembly 22 remains stationary, and thus it is possible to carry out close-up photography operations. Of course, the rotary movement of the manually operable means 1, 35 of this embodiment will displace the surface 49 of lever 37 away from the pin 45, but the pin 45 is nevertheless kept in its locking position extending into the recess 50 of main cam cylinder 9 without any possibility of the pin 45 moving out of the recess 50 inasmuch as the interior surface of the ring 35 slides over and engages the head 48 of the pin 45 so as to maintain the latter in its locking position. It is only when the manually operable means 1, 35 has been returned to the position shown in FIG.9 that the spring 47 can expand to displace the control pin 45 out of the bore 50 and again into engagement with the surface 49 of the lever 37. It will be noted that this return of the ring 35 to the angular position illustrated in FIG.9 enables the spring 44 to introduce the projection 39 into the recess 40, so that the connecting means now is in its connecting position reestablishing the engaged position of the transmission means for transmitting movement from the manually operable means 1, 35 to the lens assembly 22. Thus, simultaneously with the entry of the projection 39 into the recess 40, the control pin 45 moves out of the recess 50. Now the rings 35 and 36 will rotate together as one unit.

It is to be noted that when the rings 35 and 36 are not at the predetermined angular position illustrated in FIG.9, situating the lens assemblies 18 and 22 at the predetermined locations along the optical axis corresponding to the positions of the pins 12 and 15 in FIG.3, which is the extreme telephoto positions of these lenses, any attempt to press the button 43 will not result in any disengagement of the transmission means. At this time, the inner end of the control pin 45 will simply engage the exterior surface of the cam cylinder 9, and since it will not be possible for the pin 45 to move radially toward the optical axis, it will not be possible for any depression on the button 43 to displace the projection 39 out of the recess 40. It is clear, therefore, that the control pin 45 together with that portion of the main cylinder 9 which is formed with the recess 50 coact to form a control means which prevents the selecting means 43 from being actuated to place the transmission means in its disengaged position unless the lens assemblies 18 and 22 have been first situated at the locations along the optical axis which will be determined by the angular position of the ring 35 shown in FIG.9. Moreover, as long as the transmission means is in its disengaged position, with the ring 35 displaced from the angular position thereof shown in FIG.9, the control means 45, 50 acts to maintain the lens assembly 22 locked in its predetermined location, and it will not be possible to displace the lens assembly away from this position until the ring 35 again has been returned to the position shown in FIG.9.

Thus, during normal zoom lens operations, the control means 45, 50 acts to prevent actuation of the manually operable means 1, 35 independently of the manually operable means 6, 36 unless the lens assemblies 18 and 22 are first situated in the required predetermined locations.

Figure 10:
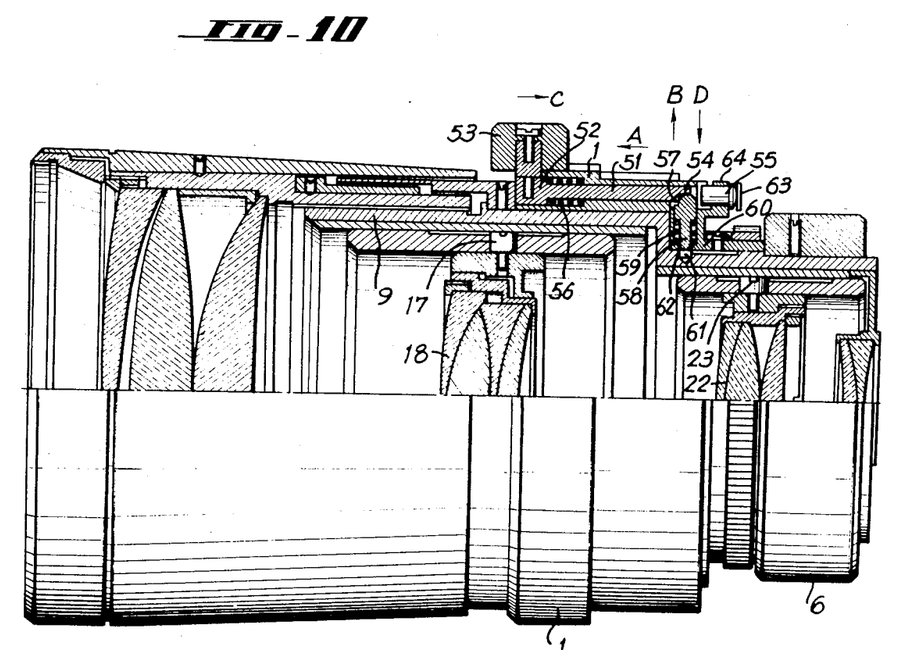
FIG. 10 is a longitudinal elevation, the upper half of which is in a sectional plane which contains the optical axis, illustrating a further embodiment of a zoom lens of the invention.
Figure 11:
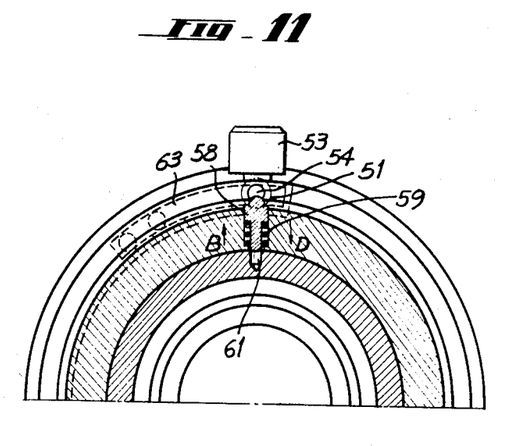
FIG. 11 is a transverse section of the upper part of FIG. 10 illustrating further details of the structure.
Figure 12:
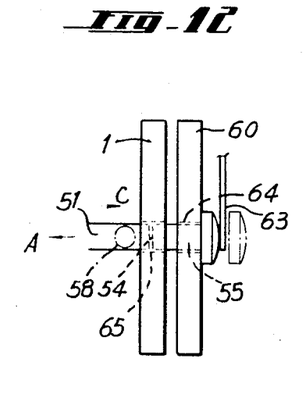
FIG. 12 is a schematic fragmentary top plan view of the structure of FIGS. 10 and 11 further illustrating the manner in which this structure operates.

With the embodiment of the invention which is illustrated in FIGS.10-12, the selecting means includes an axially movable pin 51 axially movable through an axial bore which is formed in the ring 1 of the manually operable means. This elongated pin 51 has a rear end 52 operatively connected with a knob 53 which is accessible to the operator. At its front end 54, the selecting pin 51 bears against the rear end of a second axially movable pin 55 which is urged rearwardly by the leaf spring 63. A spring 56 is coiled about the pin 51 forwardly of its enlarged rear end 52 so as to urge the pin 51 in the direction of the arrow A indicated in FIG.10. At its front tip 54 the pin 51 has a lower slanting surface 57 acting as a cam and engaging the outer end of a control pin 58 of this embodiment. A spring 59 is coiled about a portion of the control pin 58 beneath its enlarged upper end so as to urge the pin 58 outwardly away from the optical axis in the direction indicated by the arrow B. A stop ring 60 surrounds the main cam cylinder 9 and is formed with the radial bore 62 which receives the control pin 58. The cam cylinder 9 is formed with a recess or radial bore 61 into which the control pin 58 can move when the ring 60 is in the angular position indicated in FIG.10. It will be noted that the spring 63 also urges the pin 55 in the direction of the arrow A.

The spring 63 urges the pin 55 through and beyond the axial bore 64 of the stop ring 60 into an axial bore portion 65 of the ring 1. It is this bore 65 which receives the front tip 54 of the selecting pin 51. Thus, as long as the pin 55 extends into the opening 65, the connecting means formed by the pin 55 and portions of rings 1 and 60 formed with the openings which receive the pin 55 is in its connecting position placing the transmission means in an engaged position to transmit movement from the manually operable means 1 to the front or outer lens assembly 22. The elements at the location where the selecting means and connecting means are located to place the transmission means in and out of engagement are illustrated schematically in FIG.12 which clearly shows the operation of these components.

In order to carry out close-up photography with this embodiment, the manually operable means 1 is operated, while the ring 60 is connected thereto through the pin 55, so that the lens assemblies 19 and 22 will assume their extreme telephoto positions corresponding to the positions of the pins 12 and 15 in FIG.3. Once the parts have reached this position, the operator will engage the knob 53 and displace the selecting means 51 forwardly, in the direction indicated by the arrow C in FIG.12. The result is that the front tip 54 displaces the connecting pin 55 out of the opening 65 of the ring 1, in opposition to the force of the spring 63, and at the same time the slanting camming surface 57 of the selecting pin 51 depresses the control pin 58 inwardly toward the optical axis, in the direction of the arrow D indicated in FIG.10, so that the inner end of the control pin 58 will be received in the recess 61 of the main cam cylinder 9. The result is that the control pin 58 now locks the ring 60 to the main cam cylinder 9, and the lens assembly 22 remains locked in its predetermined location along the optical axis. The knob 53 may be rotated and retained in a rotated position by an unillustrated detent assembly. This will act to maintain the selecting pin 51 forwardly at its location preventing the return of the pin 55 into the opening 65 and return of the control pin 58 outwardly from the recess 61. Now it is possible for the operator to rotate the manually operable means 1 so as to move only the lens assembly 18, and thus the close-up operations can be carried out. At this time the front lens assembly 22 is locked and held in a stationary position.

In order to return the components to the position for carrying out normal zoom lens operations, the releasable detent acting on the knob 53 is released so that the spring 56 can expand to return the selecting pin 51 rearwardly to its initial position, and of course the spring 63 is now capable of returning the pin 55 into the opening 65. Thus, as soon as the ring 1 is returned to the angular position where the opening 65 will receive the pin 55, the pin 58 will return outwardly from the opening 61 and the connecting means 55 now interconnects the drive transmission from the manually operable means 1 to the lens assembly 22, so that normal zoom lens functions will now be carried out. It will be noted that with this embodiment of FIGS.10–12 the control means formed by the pin 58 and the portion of cylinder 9 which is formed with the bore 61 acts also on the one hand to prevent the transmission means from being disengaged until the lens assemblies 18 and 22 have been located at the predetermined locations indicated in FIG.10 and on the other hand to prevent displacement of the lens assembly 22 away from the predetermined location during close-up photography operations until the parts again have the position shown in FIG.10.

It is apparent, therefore, that with the above-described structure of the invention a single zoom lens enables an operator selectively to carry out both normal zoom lens operations as well as close-up photography operations simply by interconnecting and disconnecting a pair of rotary rings at the exterior of the lens barrel.

What is claimed is:

1. In a zoom lens, a pair of coaxial lens assemblies, support means supporting said assemblies for movement along their common axis, manually operable means operatively connected with one of said assemblies for displacing the latter along said axis, transmission means operatively connected with the other of said lens assemblies and normally having an engaged position engaged with said manually operable means for transmitting movement therefrom to the other of said lens assemblies for displacing the latter also along said axis, said transmission means having a disengaged position providing for movement of said manually operable means independently of said transmission means without transmission of movement from said manually operable means to the other of said lens assemblies, and selecting means coacting with said transmission means for selectively placing the latter in said engaged or disengaged positions thereof, so that when said selecting means places said transmission means in said disengaged position thereof, said manually operable means will displace only said one lens assembly along said axis for enabling close-up photography to be carried out with the zoom lens, said lens assemblies including an outer, front lens assembly and an inner, rear lens assembly, said manually operable means being connected to said inner, rear lens assembly for displacing the latter while said transmission means is operatively connected to said outer, front lens assembly for transmitting movement thereto from said manually operable means when said selecting means places said transmission means in said engaged position thereof, whereby when said lens assemblies are in an extreme telephoto position said selecting means can be actuated to place said transmission means in said disengaged position thereof so that said manually operable means will then move said inner, rear lens assembly with respect to said outer, front lens assembly to carry out close-up photography.

2. The combination of claim 1 and wherein said manually operable means operatively connected to said one lens assembly forms a first manually operable means, said transmission means including a second manually operable means operatively connected to the other of said lens assemblies for displacing the latter along said axis, and said transmission means further including a connecting means for normally releasably connecting said first and second manually operable means to each other for movement as a unit and for disconnecting said first and second manually operable means from each other when said transmission means is in said disengaged position thereof, said selecting means coacting with said connecting means for displacing the latter between positions respectively connecting said first and second manually operable means to each other and disconnecting said first and second manually operable means from each other.

3. The combination of claim 2 and wherein each of said manually operable means includes a rotary ring supported by said support means for rotation about said axis and a camming structure actuated by said ring and operatively connected with a lens assembly for displacing the latter along said axis in response to rotary movement of said ring.

4. The combination of claim 2 and wherein said connecting means includes a pair of connecting portions respectively connected operatively with said first and second manually operable means and one of which has a projection and the other of which has a recess receiving said projection when said pair of connecting portions coact to place said connecting means in said connecting position thereof, said selecting means being operatively connected with one of said connecting portions for displacing it away from the other of said connecting portions to place said connecting means in its disconnecting position to interrupt the transmission of motion from said first and second manually operable means.

5. The combination of claim 4 and wherein said rings have adjoining peripheral portions, and said connecting portions of said connecting means being located at said adjoining peripheral portions of said rings.

6. The combination of claim 4 and wherein said support means is formed with a recess and said second manually operable means carries a pin movable into said recess only when said ring of said second manually operable means is in a given angular position locating said other, front lens assembly at said extreme telephoto position, said pin normally preventing said selecting means from placing said connecting means in its disconnecting position except when said pin is free to move into said recess of said support means, so that the interruption in the transmission of motion from said first to said second manually operable means can take place only when said other, front lens assembly is at said extreme telephoto position along said axis.

7. The combination of claim 6 and wherein said first manually operable means maintains said pin in said recess of said support means, to prevent displacement of said other lens assembly from said extreme telephoto position along said axis, as long as said first manually operable means is at a position different from the position it had when disconnected from said second manually operable means.

8. The combination of claim 4 and wherein said connecting portion connected with said first manually operable means is in the form of a lever turnably connected with said first manually operable means for swinging movement between engaged and disengaged positions, said lever being formed with said recess and the other of said connecting portions being operatively connected with said second manually operable means and having said projection received in said recess when said lever is in said engaged position thereof.

9. The combination of claim 8 and wherein said lever is swingable about an axis which extends radially with respect to the optical axis.

10. The combination of claim 8 and wherein said lever is swingable about an axis situated in a plane which is normal to the optical axis.

11. In a zoom lens a pair of coaxial lens assemblies, support means supporting said assemblies for movement along their common axis, manually operable means operatively connected with one of said assemblies for displacing the latter along said axis, transmission means operatively connected with the other of said lens assemblies and normally having an engaged position engaged with said manually operable means for transmitting movement therefrom to the other of said lens assemblies for displacing the latter also along said axis, said transmission means having a disengaged position providing for movement of said manually operable means independently of said transmission means without transmission of movement from said manually operable means to the other of said lens assemblies, selecting means coacting with said transmission means for selectively placing the latter in said engaged or disengaged positions thereof, so that when said selecting means places said transmission means in said disengaged position thereof, said manually operable means will displace only said one lens assembly along said axis for enabling close-up photography to be carried out with the zoom lens, and control means coacting with said selecting means for preventing the latter from placing said transmission means in said disengaged position thereof unless said other lens assembly is at a predetermined location along said axis.

12. The combination of claim 11 and wherein said control means coacts with said transmission means, when the latter is in its disengaged position, for releasably holding said other lens assembly at said predetermined location until said selecting means again returns said transmission means to said engaged position thereof.

13. The combination of claim 12 and wherein said other lens assembly is an outer, front lens assembly while said one lens assembly is an inner, rear lens assembly, said lens assemblies being situated in an extreme telephoto position when said transmission means is engaged and said front lens assembly is at said predetermined location.

14. The combination of claim 11 and wherein said transmission means includes a connecting means for releasably connecting said lens assemblies, said connecting means including a swingable lever carried by said manually operable means and having a projecting end portion, and said other lens assembly having a portion formed with a recess for receiving said projecting end portion of said lever when said transmission means is in said engaged position thereof, said selecting means being operatively connected to said lever for displacing the latter to and from an engaged position where said end portion is in said recess, said lever being swingable about an axis parallel to the optical axis, and said control means including a pin carried by said other lens assembly for radial movement toward and away from the optical axis, said support means being formed with a recess for receiving said pin when the latter is displaced toward said optical axis and said recess being aligned with said pin only when said other lens assembly is at said predetermined location, said lever when actuated by said selecting means to displace said projecting end portion thereof out of said recess of said other lens assembly to disengage said lens assemblies acting on said pin for displacing the latter into said recess of said support means, and said one lens assembly maintaining said pin in said recess of said support means except when said one lens assembly is returned to the position it had with respect to said other lens assembly when the transmission means was displaced to its disengaged position.

15. The combination of claim 11 and wherein said transmission means includes a connecting means for connecting and disconnecting said lens assemblies from each other, said connecting means including an elongated pin carried by said other lens assembly and extending parallel to the optical axis, said one lens assembly having a portion formed with an opening for receiving said pin for connecting said lens assemblies to each other, said selecting means including an elongated rod manually displaceable parallel to the optical axis into engagement with said pin for displacing the latter out of said opening of said one lens assembly to disconnect said lens assemblies from each other, said control means including a radially extending pin carried by said other lens assembly for radial movement with respect to the optical axis and said support means being formed with a recess for receiving said radially extending pin, the latter being situated in the path of movement of said rod when the latter is displaced to disconnect said assemblies and said recess of said support means being situated with respect to said radially extending pin at a location for receiving the latter pin only when other lens assembly is at said predetermined location, so that said rod will actuate said control means to lock said other lens assembly at said predetermined location while simultaneously disconnecting said lens assemblies from each other.

* * * * *